US007362333B2

(12) United States Patent
Rao et al.

(10) Patent No.: US 7,362,333 B2
(45) Date of Patent: Apr. 22, 2008

(54) GRAPHICAL MANIPULATION IN A MOBILE WIRELESS DEVICE

(75) Inventors: Sumita Rao, San Diego, CA (US); Gowri Rajaram, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 497 days.

(21) Appl. No.: 10/771,001

(22) Filed: Feb. 3, 2004

(65) Prior Publication Data

US 2005/0168468 A1 Aug. 4, 2005

(51) Int. Cl.
*G09G 5/36* (2006.01)
*G09G 5/37* (2006.01)
*G06F 13/00* (2006.01)
*G06F 12/00* (2006.01)

(52) U.S. Cl. ...................... 345/548; 345/536; 345/537; 345/538; 345/562; 345/564

(58) Field of Classification Search ................ 345/548, 345/536-538, 683, 562, 563; 715/783, 790, 715/794, 797, 799, 806
See application file for complete search history.

(56) References Cited

U.S. PATENT DOCUMENTS 4,874,164 A 10/1989 Miner et al.
5,150,312 A * 9/1992 Beitel et al. ................ 345/418
5,867,140 A * 2/1999 Rader .......................... 345/98

OTHER PUBLICATIONS

International Search Report: PCT/US2005/002937 (Oct. 8, 2005).
"SID13506 Color LCD/CRT/TV Controller" Apr. 18, 2001, Epson Research and Development, Inc., Vancouver Design Center, XP-002329225 Tech. Manual, Document No. X25-B-Q-001-06.
Unanonymous: "Bit Blit" Wikipedia Encyclopedia XP-002329224, http://en.wikipedia.org/w/index.php?title=Bit_blit&diff=0&oldid=2468016.

* cited by examiner

*Primary Examiner*—Ulka Chauhan
*Assistant Examiner*—Hau H Nguyen

(57) ABSTRACT

Methods to manipulate the mobile wireless device screen more efficiently are provided. The method and devices allow a graphical user interface to be used more efficiently on a mobile handset with limited processing ability. A graphical user interface can be implemented on a mobile wireless device efficiently by limiting processing to only the areas of the display screen on the mobile wireless device that is changing. For example, if a graphical item is to be displayed on the display screen the value in the display screen memory location that will be covered by the graphical item can be stored for future use. If the graphical item is later moved the stored value can be retrieved and efficiently written to the display without the need to recalculate what was behind the graphical item.

18 Claims, 3 Drawing Sheets

GRAPHICAL MANIPULATION IN A MOBILE WIRELESS DEVICE

FIELD

The present invention relates generally to electronics, and more particularly to mobile wireless devices.

BACKGROUND

Devices including a display screen are common. Everything from personal computers to coffee makers typically contain some form of display screen. Many mobile wireless devices include a display screen. Many of these mobile wireless devices do not have the large amount of processing ability of personal computers. Graphical user interfaces can sometimes use a great deal of processor capacity, memory, or both. This is one reason why mobile wireless devices do not typically use graphical user interfaces, or use limited graphical user interfaces.

However, graphical user interfaces are typically popular with consumers. Many consumers find graphical user interfaces to be intuitive and easy to use. It would be advantageous to develop systems and methods that allow graphical user interfaces to be implemented on mobile wireless devices with limited processing ability, or limited memory, or both. While not as necessary, systems and methods that reduce the amount of processing necessary to implement a graphical user interface are also advantageous for systems with more processing ability.

As stated above, some mobile wireless devices with limited processing ability have limited graphical user interfaces. More "user friendly" graphic user interfaces are known for use on computers.

A "desk top" is an area of screen that typically has icons. The icons typically represent programs, or files. For example, graphical user interfaces on personal computers typically have a "desk top." On a personal computer a "mouse" is used to move a cursor to select an icon. When an icon is "double clicked" the personal computer typically runs the program associated with that icon.

As will be clear to those that are familiar with graphical user interfaces, "icons" can typically be moved around on the "desk top." Additionally different "icons" and different "windows" can be moved on top of one another. This graphics intense type operating system typically uses a great deal of processor power.

A graphical user interface using "icons" and a "desk top" can be implemented on a mobile wireless device. However, the mobile wireless device would not typically use a "mouse." Typically key depressions on the mobile wireless devices keypad would move the cursor. As stated above, a graphical user interface can some times use a great deal of memory, processing ability, or both.

A common way to implement a graphical display system is to map memory locations to locations on the display screen. FIG. 6A graphically shows one possible implementation of such a system. FIG. 6A includes components 500 of a graphical display system. The components 500 include a display screen 502 and a display memory 504. The display memory 504 is mapped to locations on the display screen 502. Values stored in the display memory 504 are shown pictorially. Values representing a pattern are stored in the display memory 504 and communicated to the display screen through the connection 506.

A portion of a display screen 502 and a portion of display screen memory 504 are shown on FIG. 6B. The portion of the display screen 502 is shown as 552 on FIG. 6B and the portion of display memory is shown as 583. The values stored in the portion of display screen memory 583 are shown as binary digits. Recall that the values stored in the display screen memory 504 of FIG. 6A are shown pictorially. In FIG. 6B values for a portion of the display screen memory 584 are shown. The portion 583 of the screen memory 504 includes five stored values. Reading from left to right, the value "0" 570 corresponds to the dark pixel 554 shown on the portion of display screen 552. The value "1" 575 corresponds to the light pixel 558. The value "1" 577 corresponds to the light pixel 560. The value "0" 572 corresponds to the dark pixel 556 shown on the portion of display screen 552 and the last value "1" 579 corresponds to the light pixel 562.

In order to efficiently implement a graphical user interface on a mobile wireless device with limited processing power, limited memory, or both, an efficient way to process values stored on in the display screen memory should be found. In other words, a way to efficiently process values in a memory mapped display should be found. Examples have been discussed involving mobile handsets with limited processor power. However, it will be clear to those of skill in the art that this efficient way to process values stored in the display screen memory could also be used to make mobile wireless devices that are not as limited by processor power to operate more efficiently.

SUMMARY

Many mobile wireless devices use processors with limited processing ability, limited memory, or both. This is typically done to reduce the cost of the mobile wireless device. This is especially true for low-end mobile wireless devices. Mobile wireless devices with limited processing ability do not usually use a graphical user interface such as those that can be found on personal computers and personal digital assistants. Graphical user interfaces are typically considered by some users to be intuitive and easy to use. It would be advantageous to use a graphical user interface on a mobile wireless device, especially mobile wireless devices that have limited processing ability.

As stated above, some mobile wireless devices with limited processing ability have limited graphical user interfaces. The methods and devices discussed would typically enable these limited graphical user interfaces to be implemented more efficiently. However, as stated above, the methods and devices discussed here may be able to efficiently implement a graphical user interface that is much less limited. For example, a graphical user interface that has a "desk top" and icons that can be moved around on the "desk top" has been described.

Methods to manipulate the mobile wireless device screen more efficiently are provided. The method and devices allow a graphical user interface to be used more efficiently on a mobile handset with limited processing ability. A graphical user interface can be implemented on a mobile wireless device efficiently by limiting processing to only the areas of the display screen on the mobile wireless device that is changing.

For example, if a graphical item is to be displayed on the display screen the value in the display screen memory location that will be covered by the graphical item can be stored for future use. If the graphical item is later moved the stored value can be retrieved and efficiently written to the display without the need to recalculate what was behind the graphical item.

Advantages typically include enabling a mobile handheld to implement a graphical user interface efficiently. In some cases the mobile wireless device may be able to move graphical items around the display screen more quickly. Additionally, devoting less processor cycles to the graphical user interface will typically allow the processor to devote more time to other tasks related to the device, increasing the efficiency of the entire device. In some cases enabling a mobile handheld to implement a graphical user interface efficiently may be the difference between being able to implement a graphical user interface that will be responsive enough for the user and not being able to implement the graphical user interface. In these cases the advantages associated with a graphical interface can not be realized without the ability to implement the interface more efficiently. Some advantages to a graphical user interface include, but are not limited to, the fact that graphical user interfaces are typically considered by some users to be intuitive and easy to use. Additionally, many users like graphical user interfaces.

BRIEF DESCRIPTION OF THE DRAWINGS

For a more complete understanding of the present invention, and the advantages thereof, reference is now made to the following descriptions taken in conjunction with the accompanying drawings, tables and attachments, in which.

DETAILED DESCRIPTION

Figure 1:
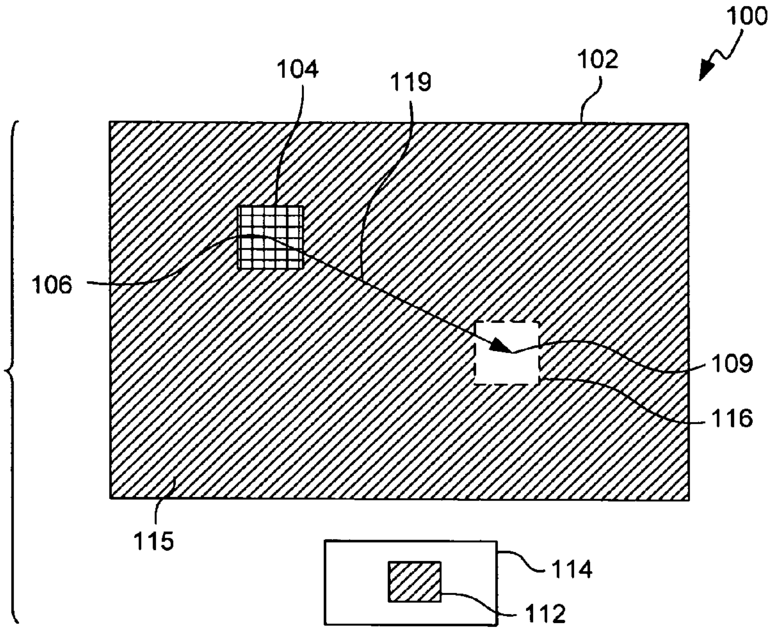
FIG. 1 shows a diagram that shows a graphical item being moved on a display screen.

Referring now to FIG. 1 a diagram 100 will be discussed. The diagram 100 includes a display screen 102. The display screen 102 is displaying a pattern 115 in the form of a background. In the diagram a first graphical item 112 that is part of the background is covered up by a second graphical item 104 at a first position 106. The first graphical item 112 is stored in a first display screen memory location in a storage memory 114. The second graphical item is to be moved to a second position 109. When the second graphical item 102 is moved to the second position 109 a third graphical item 116 that is part of the background is covered up, this movement is indicated by the arrow 119. A flowchart describing steps used in one method is discussed with respect to FIG. 2. Additionally, a series of diagrams similar to FIG. 1 are shown in FIG. 3. The diagrams 100 of FIG. 1 show the steps used in the method of FIG. 2.

It will be understood by those of skill in the art that a graphical item includes, but is not limited to a single pixel, a group of pixels, or multiple groups of pixels. The pixel, groups of pixels, or multiple groups of pixels could be simply on or off. Some number of pixels within a group or multiple groups could be on while another subgroup of pixels could be off. Additionally, the pixels, groups of pixels, or multiple groups of pixels could be different colors. Again different pixels within groups or multiple groups can each be different colors.

It will also be understood that a graphical item could be a background or some portion of a background. In addition a graphical item could be an icon. For example, In FIG. 1 the first graphical item and the third graphical item may be backgrounds. While the second graphical item may be an icon.

Figure 6A:
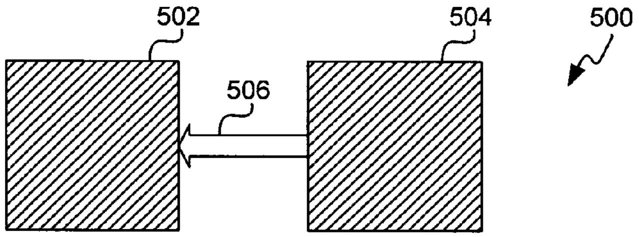
Fig. 6A (Prior Art)
FIG. 6A is a diagram that shows components of a graphical display system.
Figure 6B:
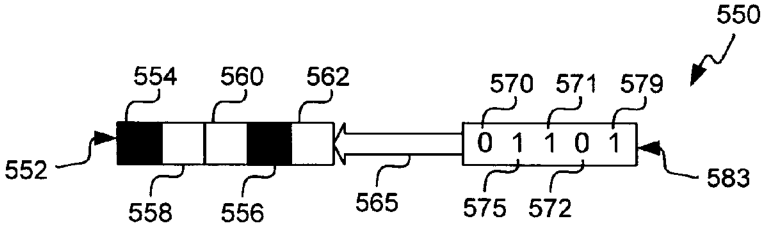
Fig. 6B (Prior Art)
FIG. 6B is a diagram that shows a subset of the display screen and display screen memory.

The term value is also used extensively. It will be understood that value is typically any numerical information that is used to store graphical information in some form of memory storage device. The term value could mean the individual binary digits shown with respect to FIG. 6B. Additionally, multiple binary digits could be used for a single pixel when color information needs to be stored. The exact method of storage is not critical. The term value is simply used to refer to any numerical storage of graphical information. Many different storage devices are also possible. The storage device would typically be some form of silicon based memory such as random access memory (RAM) however, many other forms of storage are possible.

Advantages of the methods and devices discussed include, but are not limited to enabling a mobile wireless device to implement a graphical user interface efficiently. Including in some cases, the ability to move graphical items around the screen more quickly.

Figure 2:
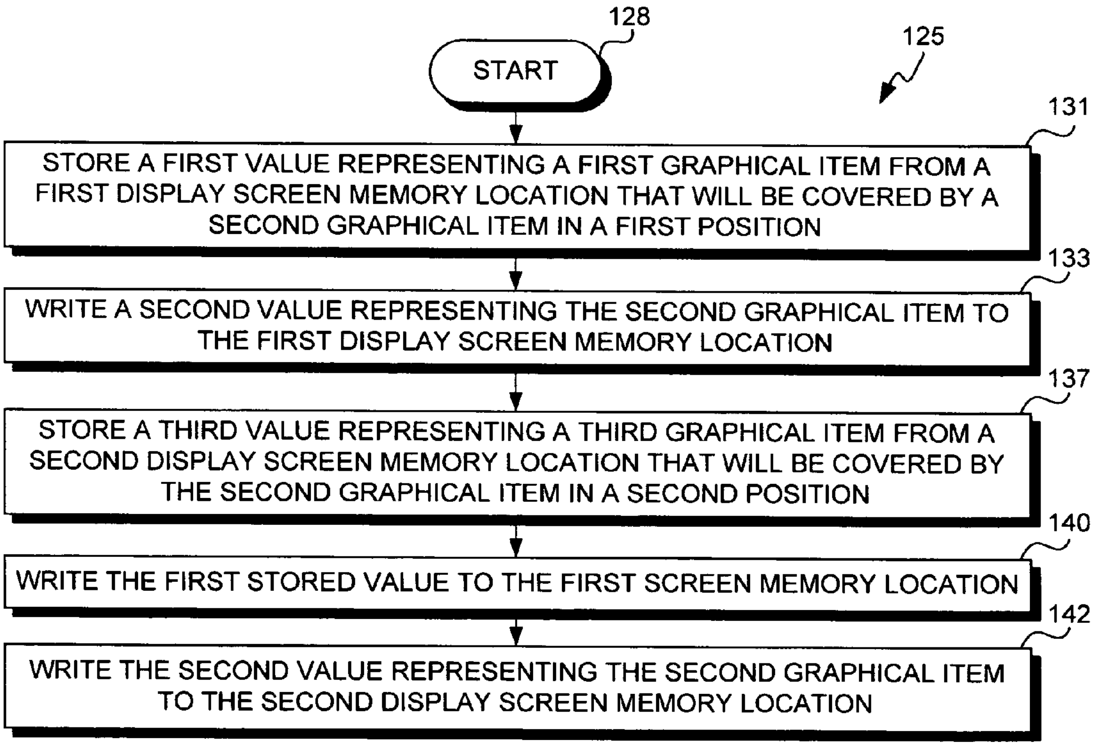
FIG. 2 shows a flowchart that shows a method for moving a graphical item on a mobile wireless device screen.

Referring now to FIG. 2 a flowchart 125 will be discussed. The flowchart 125 shows steps that are used in one method. The steps will be described with respect to FIG. 1. Additionally, while the flowchart shows one possible order of steps other possible orders are possible and will be understood by those of skill in the art. An example of an alternate order will be discussed below.

The flowchart 125 begins at step 128. At step 131 a first value is stored. The value represents a first graphical item from a first display screen memory location. The first graphical item will be covered by a second graphical item in a first position. The first graphical item is stored so that it can be written back to the display screen memory when the second graphical item is moved. Writing the first graphical item back to display memory will cause that item to be displayed on the display screen 102. Referring back to FIG. 1, the first graphical item 112 is shown stored in a storage memory 114.

In step 133 a second value representing a second graphical item is written to the first display screen memory location. This causes the second graphical item to be displayed on the display screen. The second graphical item is shown as 104 in FIG. 1. In step 137 a third value representing a third graphical item is stored. The third value is from a second display screen memory location. The third graphical item is shown as 116 on FIG. 1. As shown by the arrow 119 on FIG. 1 the third graphical item will be covered by the second graphical item when it is moved to the second position 109.

Continuing with FIG. 2, in step 140 the first stored value is written to the first screen memory location. This is to cause the background to be displayed at the first position 106 after the second graphical item is moved.

In step 142 the second value representing the second graphical item is written to the second display screen memory. In other words, the second graphical item is moved to the second position. The second position could be the second position 109 shown on FIG. 1. Advantages include the allowing the processor to devote more time to other tasks increasing the efficiency of the entire device. In some cases this may be the difference between being able to implement a graphical user interface that is responsive enough for the user. In these cases the advantages associated with a graphical user interface would not be realized without the ability to implement the interface more efficiently.

It will be clear to those of skill in the art that, in some cases, steps 140 and 142 of FIG. 2 could be executed in either the order shown, 140 followed by 142 or the reverse order, 142 followed by 140. No order should be inferred for the steps shown. However, in cases where the second graphical item covers a portion of the first graphical item step 140 would typically need to be performed before step 142.

Figure 3A:
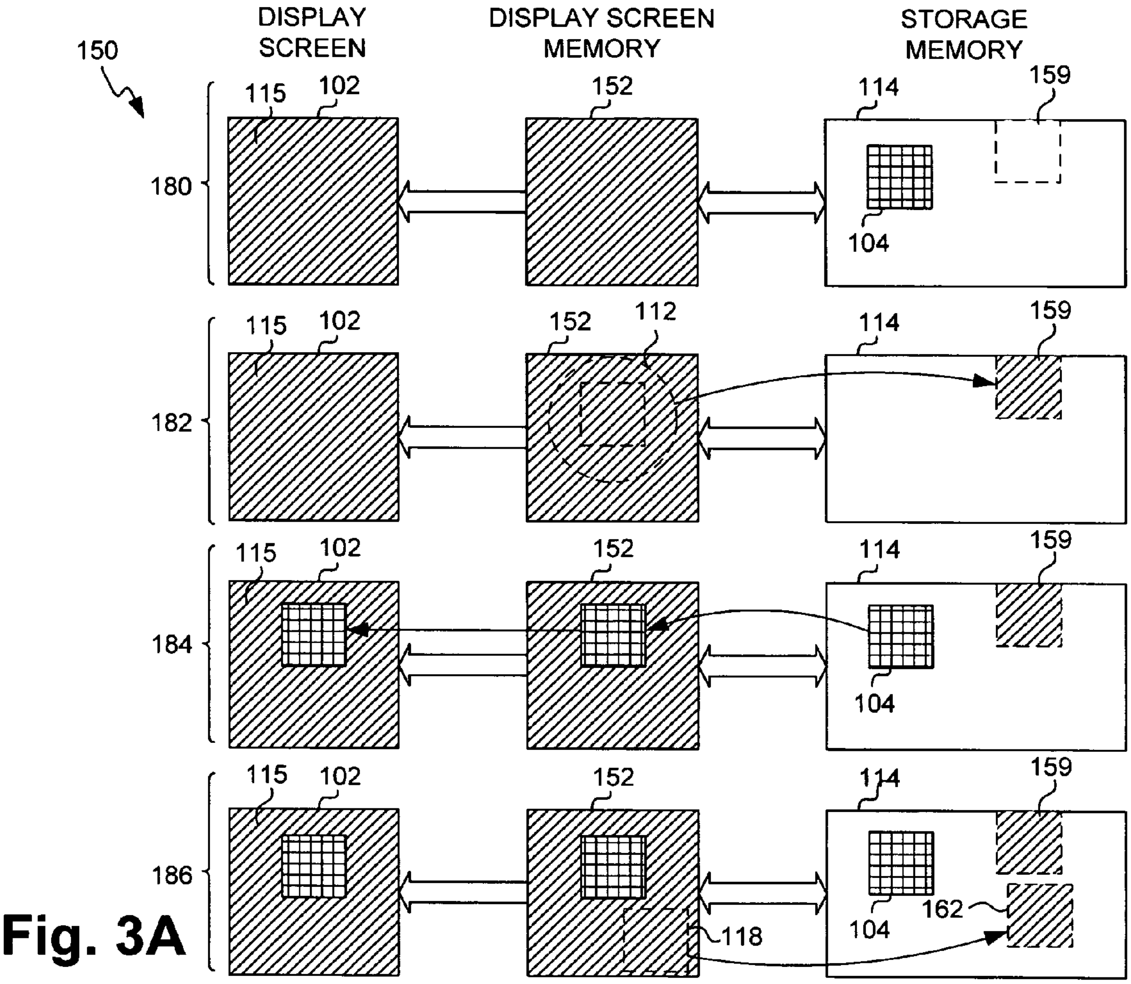
FIGS. 3A and 3B is a diagram that shows a graphical item being moved on a display screen.
Figure 3B:
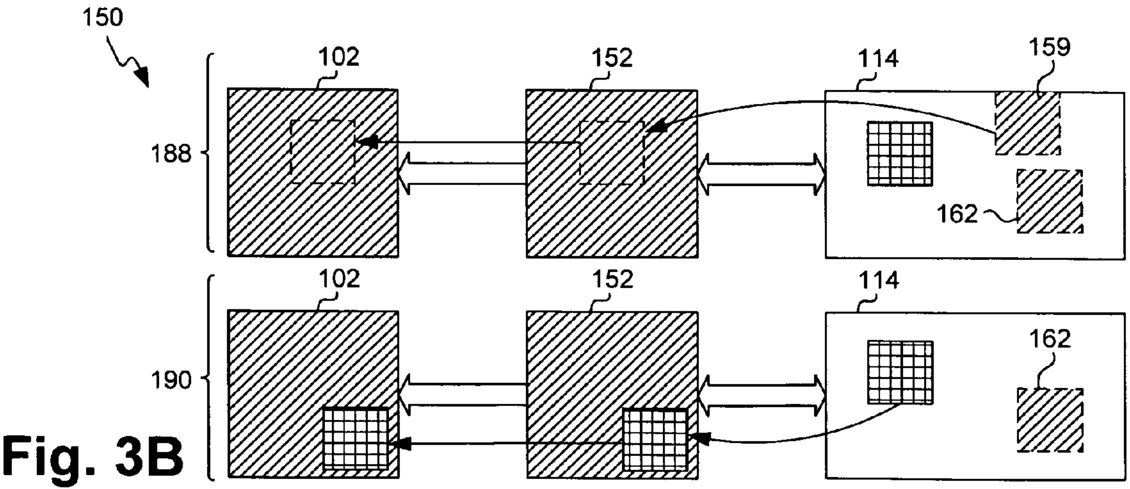

Referring now to FIG. 3A and FIG. 3B a series of diagrams 150 that shows the step by step process of FIG. 2 is shown. The diagrams 150 are similar to FIG. 1. The multiple steps of FIG. 2 are shown in a graphical form similar to FIG. 1. The diagrams 150 begins with part 180. Part 180 is an introductory part showing the framework in which the steps of FIG. 2 are performed. Part 180 shows a display screen 102 the same or similar to the display screen 102 of FIG. 1. The display screen 102 is displaying a pattern 115 that is also the same or similar to the pattern 115 in the form of a background of FIG. 1. Note that in part 180 no additional graphical items such as the second graphical item 104 of FIG. 1 are shown.

The display screen 102 is coupled to a display screen memory 152. The display screen memory is not shown in FIG. 1. Additionally, the display screen memory 152 is coupled to a storage memory 114. The storage memory 114 has a value representing a graphical item, a second graphical item 104, stored in the storage memory 114. The graphical item 104 is the same or similar to the graphical item 104 of FIG. 1. In some cases a display screen memory 152 may be included in the display screen. For example, if the display screen functions as a memory the processor may write directly to the display screen. In this example, the display screen memory is integral to the display screen. It will be understood that writing to or otherwise using, the display screen includes writing to or otherwise using the display screen memory. It will also be understood that any form of state storage device can be used as memory, including, but not limited to capacitate storage, magnetic storage, and optical storage. The memory types may include, but is not limited to FLASH, RAM, SRAM, DRAM, SDRAM, etc. As discussed above, the memory may be discrete or may be part of the display screen, additionally, the memory may be built into other components, such as, for example the processor.

Part 182 of FIG. 3A shows a possible first step in efficiently moving a graphical item. Recall that part 180 is an introductory part showing the framework in which the steps are performed. Part 182 is the same or similar to step 131 of FIG. 2. A first graphical item 112 is stored in the storage memory 114 at memory location 159. This is done because this area of the display screen 102 will be covered by a second graphical item 104. Typically the first graphical item 114 that is stored will be the same size and shape as the second graphical item. Additionally, the first graphical item will typically be stored in the same amount of memory as the second graphical item. In other words, typically only screen data that is going to be overwritten is stored. However, this is only one example. In some cases the size of the first and second graphical items will be different.

Part 182 of FIG. 3A is followed by part 184. Part 184 is the same or similar to step 133 of FIG. 2. In part 184 the second graphical item is written to the display screen memory 152 and displayed on the display screen.

At part 186 a third graphical item 118 is stored in the storage memory 114 at memory location 162. This is the same or similar to FIG. 2, step 137. Again, similar to part 182, typically the third graphical item 118 is stored will be the same size and shape as the second graphical item. However, different sizes and shapes are possible. It should be pointed out that it is typically advantageous to store graphical items that are the same size and shape. For example, if the second graphical item is an icon and the first and third graphical items are portions of background covered at a particular time by the icon then it would typically be advantages to only store the portions of background that are covered by the icon.

Part 188 shows the first stored value being written to the first screen memory location. This is the same or similar to FIG. 2, step 140. In part 190 the second value representing the second graphical item is written to the second display screen memory location. This is done so that the second graphical item is displayed on the display screen at the second position 109 of FIG. 1. This is the same or similar to FIG. 2, step 142.

As can be seen on FIGS. 3A and 3B values representing graphical items are written to different memory locations to store graphical items or display graphical items on the display screen. Typically moving values from one memory location to another memory location is much less processor intensive than recalculating display screen images. Display screen images can include one or more graphical items. For this reason, advantages include the ability to more efficiently move graphical items on a display screen. Additionally, in some cases it may take more memory to recalculate display screen images than it does to store graphical items as described with respect to FIG. 3A and 3B. In these cases memory can typically be saved.

In one specific example the first graphical item 112 could be a first portion of graphical background. The second graphical item 104 could be, in this example, a graphical image such as an icon. The third graphical item could be, in this example, another portion of graphical background.

The icon needs to be drawn on a screen at the location where the first portion of graphical background is located. The first portion of graphical background is stored. This is the same or similar to part 182 as shown on FIG. 3A.

Continuing with the specific example, the icon is stored in a display screen memory and displayed on the screen at the location where the first portion of background used to be. This is the same or similar to part 184.

When the first graphical item needs to be moved to a new location the background at the new location is stored. This is the same or similar to part 186 shown on FIG. 3A. The first portion of graphical background is written to the display screen memory 152 and displayed on the display screen. This is the same or similar to part 188 of FIG. 3B.

Similar to part 190 of FIG. 3B, the icon is then written to the display screen memory and displayed on the display screen. While the example discussed with respect to FIGS. 3A and B and the specific example discussed above show each step in a specific order, it will be clear to those of skill in the art that other orders are possible.

Figure 4:
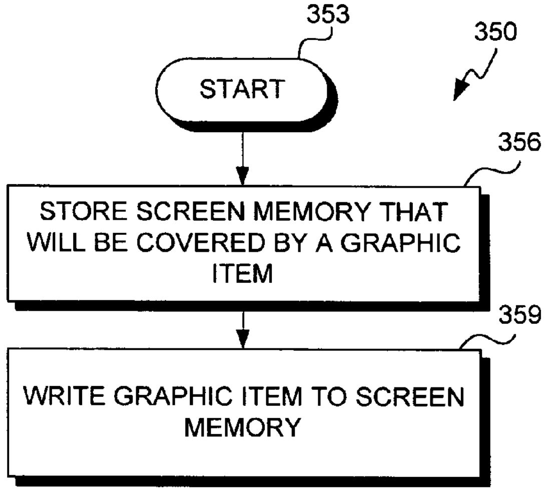
FIG. 4 is a flow chart that shows a method for moving a graphical item on a mobile wireless device screen.

Referring now to FIG. 4 a flowchart is shown. The flowchart 350 highlights two of the steps from the flowchart 125 of FIG. 2. The flowchart 350 begins at 353. Step 353 is the same or similar to step 131. In step 356 screen memory that will be over written when by another graphical item is stored. In step 359 the screen memory is over written by the graphic item. Step 359 is similar to steps 133 and 142 of FIG. 2. Advantages include in many cases, the ability to move graphical items around a display screen more quickly.

Figure 5:
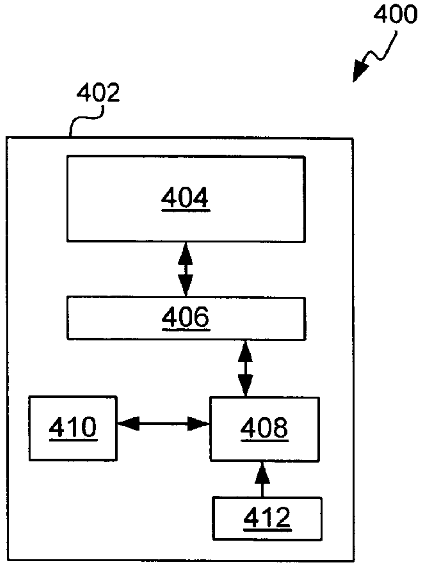
FIG. 5 is a diagram of a mobile wireless device.

Referring to FIG. 5 mobile wireless device 400 is shown. The mobile wireless device 400 includes a case 402 and a display screen 404. In this example the case 402 encloses several components. Note that the display screen 404 is shown inside of the case 402. It will be understood that typically the case includes a clear plastic cover so that the display screen 404 is protected and can be viewed. It will be understood that which components are inside and which components may be outside of the case is not critical. Aspects of the device are only limited by the claims.

The display screen 404 is coupled to a screen memory 406. The screen memory is used to store information relating to what is displayed on the display screen. The display memory is coupled to a processor, which includes embodiments using one or multiple processors. The processor can write to the display memory to cause graphical items to be displayed on the display screen 404. Additionally the processor 408 is coupled to a storage memory 410 and may include a direct memory access controller, and is further coupled to a mobile power source in the form of a battery 412 for power. It will be understood that battery 412 could include any form of mobile power source.

We claim:

1. A mobile wireless device comprising:
- a display screen;
- a display screen memory coupled to the display screen and configured to control the display screen;
- a storage memory;
- a processor coupled to the display screen memory and the storage memory, and configured to perform the steps of:
- storing to the storage memory a first graphical item corresponding to a first value and a first shape and a first size when displayed on the display screen;
- determining a first location in the display screen memory, the first location having a second value which corresponds to a second graphical item having a shape and a size substantially the same as the first shape and the first size;
- storing the second value to the screen display memory;
- determining a second location in the display screen memory, the second location having third graphical item corresponding to a third value and having a shape and a size substantially the same as the first shape and the first size;
- storing the third value to the storage memory;
- writing the first value to the first location from the storage memory to the display screen memory;
- writing the second value to the second location from the storage memory to the display screen memory;
- a mobile power source configured to power the processor.

2. The mobile wireless device of claim 1 wherein the processor is multiple processors.

3. The mobile wireless device of claim 1 wherein the processor includes a direct memory access controller.

4. The mobile wireless device of claim 1 wherein the first value in the first display screen memory is a plurality of values in a plurality of display screen memory locations.

5. The mobile wireless device of claim 4 wherein the plurality of values represent a screen background.

6. The mobile wireless device of claim 1 wherein the second value is a plurality of values in a plurality of display screen memory locations.

7. The mobile wireless device of claim 6 wherein the plurality of values represent a screen background.

8. The mobile wireless device of claim 1 wherein the first graphical item is an icon.

9. The mobile wireless device of claim 1 wherein the first value, second value, and third value stored each require the same amount of memory to store each of the three graphical items.

10. The mobile wireless device of claim 1 wherein each graphical item comprises multiple pixels.

11. A method of moving a graphical item on a mobile wireless device screen comprising:
- a display screen;
- a display screen memory coupled to the display screen and configured to control the display screen;
- a storage memory;
- a processor coupled to the display screen memory, and the storage memory, and configured to perform the steps of:
- storing to the storage memory a first graphical item corresponding to a first value and a first shape and a first size when displayed on the display screen;
- determining a first location in the display screen memory, the first location having a second value which corresponds to a second graphical item having a shape and a size substantially the same as the first shape and the first size;
- storing the second value to the screen display memory;
- determining a second location in the display screen memory, the second location having third graphical item corresponding to a third value and having a shape and a size substantially the same as the first shape and the first size;
- storing the third value to the storage memory;
- writing the first value to the first location from the storage memory to the display screen memory;
- writing the second value to the second location from the storage memory to the display screen memory;
- a mobile power source conjured to power the processor.

12. The method of claim 11 wherein the first value in the first location is a plurality of values in a plurality of locations.

13. The method of claim 12 wherein the plurality of values represent a screen background.

14. The method of claim 11 wherein the first value in the second location is a plurality of values in a plurality of locations.

15. The method of claim 14 wherein the plurality of values represent a screen background.

16. The method of claim 11 wherein the first graphical item is an icon.

17. The mobile wireless device of claim 11 wherein the first value, second value, and third value stored each require the same amount of memory to store each of the three graphical items.

18. The method of claim 11 wherein each graphical item comprises multiple pixels.

* * * * *